United States Patent [19]

O

[11] Patent Number: 6,061,338
[45] Date of Patent: May 9, 2000

[54] MOBILE COMMUNICATION SYSTEM

[75] Inventor: Waho O, Tokyo, Japan

[73] Assignee: Oki Electric Industry Co., Inc., Tokyo, Japan

[21] Appl. No.: 08/823,994

[22] Filed: Mar. 25, 1997

[30] Foreign Application Priority Data

Oct. 25, 1996 [JP] Japan .................................. 8-283885

[51] Int. Cl.[7] .................................................. H04B 7/216
[52] U.S. Cl. ......................... 370/335; 370/350; 375/145; 455/436
[58] Field of Search .................................... 370/328, 329, 370/331, 335, 350, 342, 320, 503; 455/436, 437, 438, 439, 444; 375/140, 145

[56] References Cited

U.S. PATENT DOCUMENTS

| | | | |
|---|---|---|---|
| 5,313,489 | 5/1994 | Menich et al. ........................... | 370/332 |
| 5,335,355 | 8/1994 | Tanaka et al. ........................... | 455/553 |
| 5,422,931 | 6/1995 | Austin-Lazarus et al. .............. | 455/553 |
| 5,754,542 | 5/1998 | Ault et al. ................................ | 370/342 |
| 5,805,575 | 9/1998 | Kamin, Jr. ............................... | 370/335 |
| 5,848,063 | 12/1998 | Weaver, Jr. et al. ..................... | 370/331 |

*Primary Examiner*—Chau Nguyen
*Assistant Examiner*—Soon-Dong Hyun

[57] ABSTRACT

In a mobile communication system, a mobile station located in an area using an analog system receives information for synchronization from a base station situated in the above area. On moving from the area using an analog system to an area using a CDMA (Code Division Multiple Access) area, the mobile station acquires a pilot channel from a base station located at the CDMA area. For this purpose, the mobile station generates a phase set signal on the basis of the information received in the analog system area. The phase set signal resets an I-phase and a Q-phase spread code generator included in a serial search acquisition circuit for acquiring the pilot channel. As a result, spread codes output from the spread code generators are causes to coincide in phase with a spread code used to spread a signal being received over the pilot channel. This allows the mobile station to acquire the pilot channel in the CDMA system area in an extremely short period of time.

7 Claims, 5 Drawing Sheets

MOBILE COMMUNICATION SYSTEM

BACKGROUND OF THE INVENTION

1. Field of the Invention

The present invention relates to a mobile communication system and, more particularly, to a mobile communication system allowing a mobile station to acquire a pilot channel rapidly when moved from an area using an analog system to an adjoining area using a CDMA (Code Division Multiple Access) system.

2. Description of the Background Art

It has been customary with a cellular mobile phone system to use an AMPS (Advanced Mobile Phone System) or similar analog cellular system. Today, however, digital cellular systems are under study and development because the analog cellular system cannot cope with the overwhelming number of subscribers. Among the digital cellular systems heretofore proposed, a CDMA cellular system is attracting increasing attention because it is capable of spreading the frequency bandwidth of signals to be transmitted up to about 1.25 MHz by a spectrum spread technology. With the CDMA system therefore, it is possible to implement a system having a huge capacity on the basis of delicate control over transmission power, various kinds of diversity effects, soft handoff, and so forth.

In the CDMA cellular system, signals of the same frequency to be sent from a base station to mobile stations are each spread by a particular spread code. The resulting signals with a spread spectrum are superposed and sent to the mobile stations. Each mobile station despreads a received signal spread by a desired spread code by use of a local spread code synchronous with the desired spread code. As a result, interference waves are despread and turn out noise, while only a desired signal is demodulated in a narrow bandwidth.

In practice, the transition from the analog cellular system to the CDMA cellular system will be originated in areas accommodating a great number of subscribers. Presumably therefore, an analog system using the analog cellular system and a CDMA system using the CDMA cellular system will coexist for the time being, and may even adjoin or overlay each other. A subscriber intending to receive services from both the analog and CDMA systems must use a mobile station capable of communicating with the two systems. When the mobile station with such a capability moves from an analog system area to a CDMA system area, the user of the mobile station is expected to end conversation based on the analog system, and then switch the mobile station from an analog mode to a CDMA mode. After the mobile station has become ready to receive an incoming call based on the CDMA system, the user is allowed to again originate a call and resume the interrupted conversation.

The prerequisite with the CDMA system is that the local spread code generated in the mobile station be coincident in timing with the spread code generated in the base station (synchronization), so that a desired received signal can be demodulated. While various methods have been proposed for the synchronization in the past, serial search acquisition is a practical method available at the present stage of development. The serial search acquisition is such that the mobile station generates a spread code at a suitable timing first, and then sequentially shifts the timing until it coincides with the timing of the spread code being received from the base station.

However, the problem with the serial search acquisition scheme is that a substantial period of time, even one period of the spread code in the worst case, is necessary for the synchronization to be set up. Particularly, in the CDMA system whose spread code has a long period, a critically long period of time is necessary for the synchronization to be set up. For example, the evaluation report of actual field tests conducted with a CDMA cellular system prescribed by the North American Standard IS-95 teaches that the synchronizing time was as long as 10 seconds to 15 seconds.

SUMMARY OF THE INVENTION

It is therefore an object of the present invention to provide a mobile communication system allowing a mobile station moved from an analog system area to a CDMA system area to synchronize itself with the CDMA system rapidly.

A mobile communication system of the present invention includes a first communication system including a device for transmitting a signal spread by a preselected spread code over a pilot channel. A second communication system has a device for transmitting information for synchronization with the spread code. A mobile station has a device for receiving the information transmitted from the second communication system, a spread code generator for generating a spread code identical with the preselected spread code of the first communication system, and a device for causing, based on the above information, the phase of the spread code output from the spread code generator to coincide with the phase of the preselected code of the first communication system.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 2:
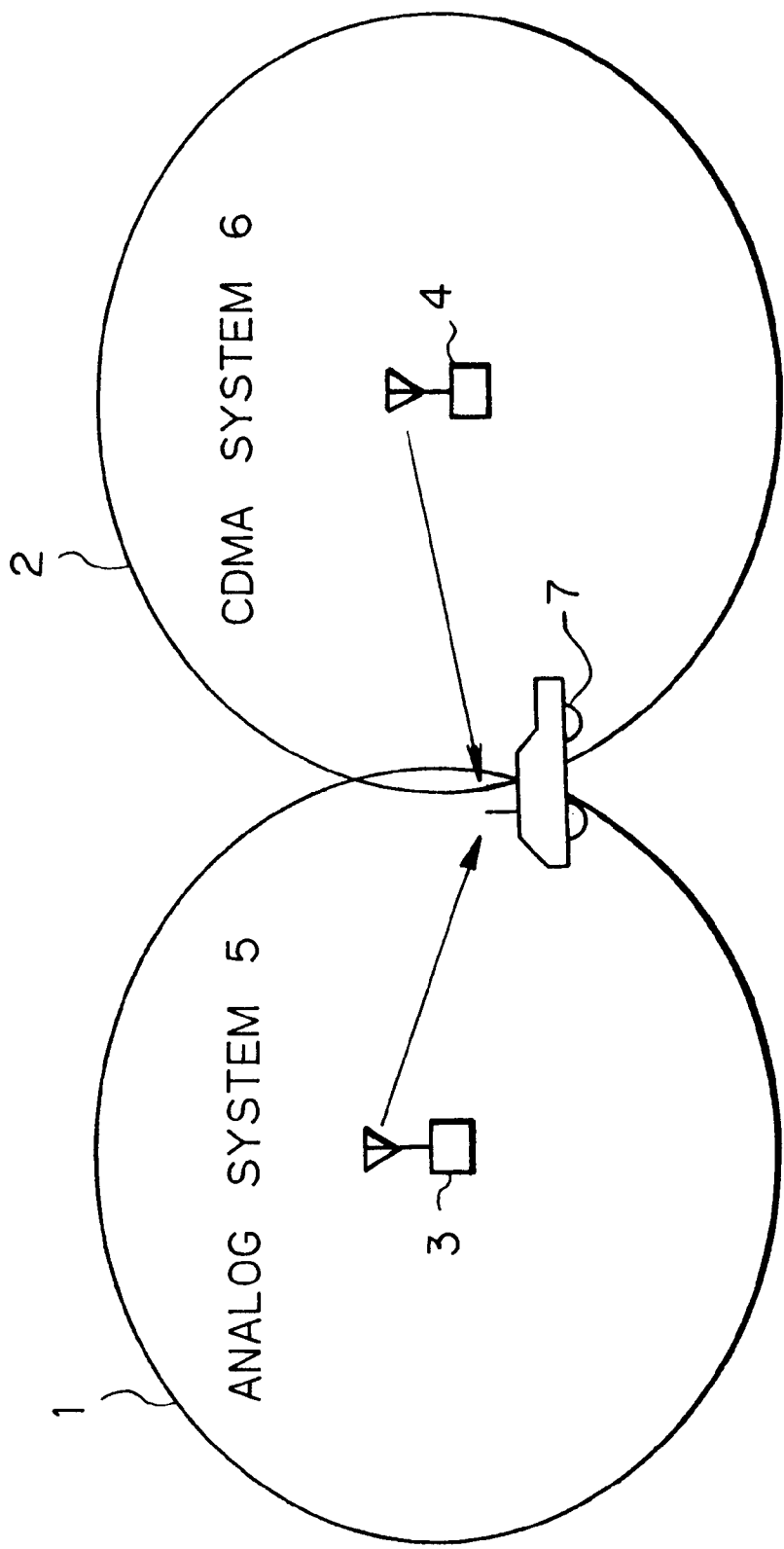
FIG. 2 shows a part of a specific mobile communication system to which the embodiment is applied.

Referring to FIG. 2 of the drawings, a specific mobile communication system to which the present invention is applicable is shown. As shown, the system includes small areas or cells 1 and constituting a service area together with the other service areas, not shown. The cells 1 and 2 adjoin or overlap each other, as illustrated. A base station 3 situated in the cell 1 and mobile stations present in the cell 1 constitute a single analog system 5 implementing analog communication using FM (Frequency Modulation) or PM (Phase Modulation). A base station 4 situated in the cell 2 and mobile stations located in the cell 2 constitute a single CDMA system for CDMA communication using the spread spectrum technology mentioned earlier.

Assume a mobile station 7 moving from the cell 1 to the cell 2 and capable of receiving services in both of the cells 1 and 2, i.e., having a function of communicating with the base station 3 by the analog system and with the base station 4 by the CDMA system. Also, assume that the user of the mobile station 7 is holding conversation on the station 7. Then, the user ends the communication, and then switches the base station 7 from an analog mode to a CDMA mode. In response, the mobile station 7 sets up synchronization with the CDMA system 6 and becomes ready to receive an incoming call. Subsequently, the user again originates a call on the mobile station 7 so as to resume the interrupted communication.

The base station 3 includes means for sending to the individual mobile station located in the cell 1 information useful for the mobile station to set up synchronization with the CDMA system 6 rapidly when it enters the cell 2. The base station 3 sends such information for rapid synchronization to the mobile stations in the cell 1 in such a manner as not to affect communication channels assigned to the analog system 5. For example, to send the information, the base station 3 uses an exclusive control channel independent of the communication channels, more specifically a spare data field included in the control channel and not used by the analog system 5. In the illustrative embodiment, the base station 3 is assumed to complete the transmission of the above information to, e.g., the mobile station 7 at least before the station 7 enters the cell 2.

The mobile station 7 includes means for communicating with the base stations 3 and 4 by the analog/CDMA system, means for receiving the information for rapid synchronization sent from the base station 3 over the exclusive control channel, and a memory for storing the received information temporarily therein. On entering the cell 2, the mobile station 7 sets up synchronization with the CDMA system 6 by using the information stored in the memory.

Figure 3:
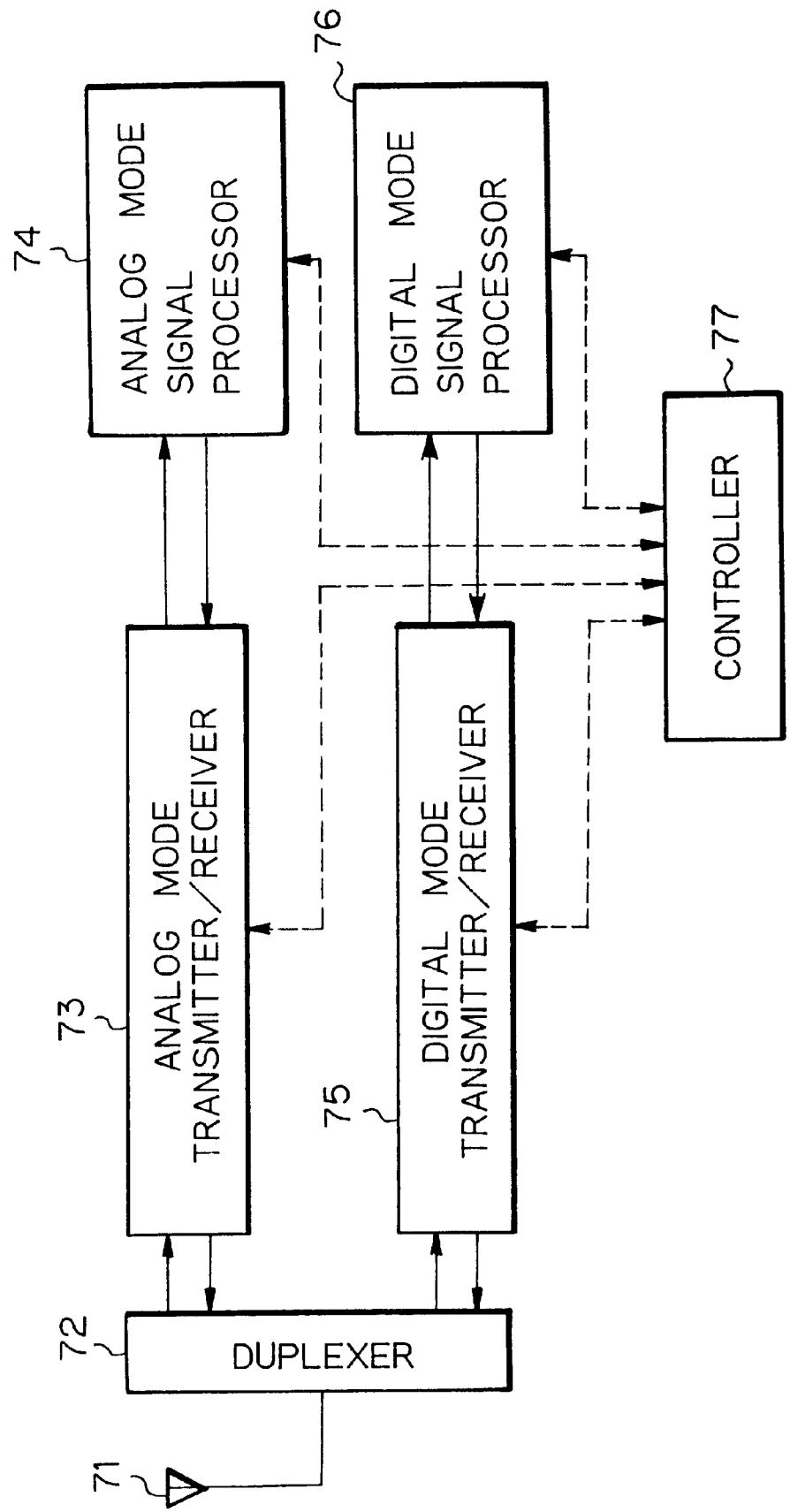
FIG. 3 is a block diagram schematically showing a specific configuration of a mobile station included in the embodiment.

FIG. 3 shows a specific configuration of the mobile station 7. As shown, the mobile station 7 includes an antenna 71 for receiving a signal. A signal coming in through the antenna 71 is fed to an analog mode transmitter/receiver 73 and a digital mode transmitter/receiver 75 via an antenna duplexer 72. A signal output from the transmitter/receiver 73 or 75 is radiated via the duplexer 72 and antenna 71. The transmitters/receivers 73 and 75 respectively operate when an analog mode is selected and when a digital mode is selected. The transmitter/receiver 73 demodulates the signal coming in through the antenna 71 by FM, and delivers the demodulated signal to an analog mode signal processor 74. Also, the transmitter/receiver 73 modulates a signal output from the signal processor 74 by FM, and feeds the modulated signal to the antenna 71 via the duplexer 72. The signal processor 74 reproduces a speech from received data output from the transmitter/receiver 73, or codes an input speech and delivers the resulting code to the transmitter/receiver 73 as data to be transmitted.

The transmitter/receiver 75 and signal processor 76 operate when the CDMA mode is selected. On receiving the signal from the duplexer 72, the transmitter/receiver 75 despreads the signal by use of a spread code referred to as PN sequence and thereby restores a linear modulated signal, e.g., FSK (Frequency Shift Keying) modulated signal. Then, the transmitter/receiver 75 demodulates the linear modulated signal, and feeds the demodulated signal or data to the signal processor 76. Also, the transmitter/receiver 75 executes linear modulation, e.g., FSK modulation with data output from the signal processor 76, spreads the resulting modulated signal with the PN sequence, and delivers the spread signal to the duplexer 72. The signal processor 76 reproduces a speech from the received data output from the transmitter/receiver 75, or codes an input speech and delivers the resulting code to the transmitter/receiver 75 as data to be transmitted.

A controller 77 is implemented by, e.g., a CPU (Central Processing Unit). In response to the user's operation or control signals received from the base station 3 or 4, the controller 77 effects analog/CDMA mode switching and controls the transmitter/receiver 73, signal processor 74, transmitter/receiver 75, and signal processor 76. In addition, the mobile station 7 has the previously mentioned means for receiving the information for rapid synchronization from the base station 3, and the memory for storing the formation, although not shown specifically.

Figure 4:
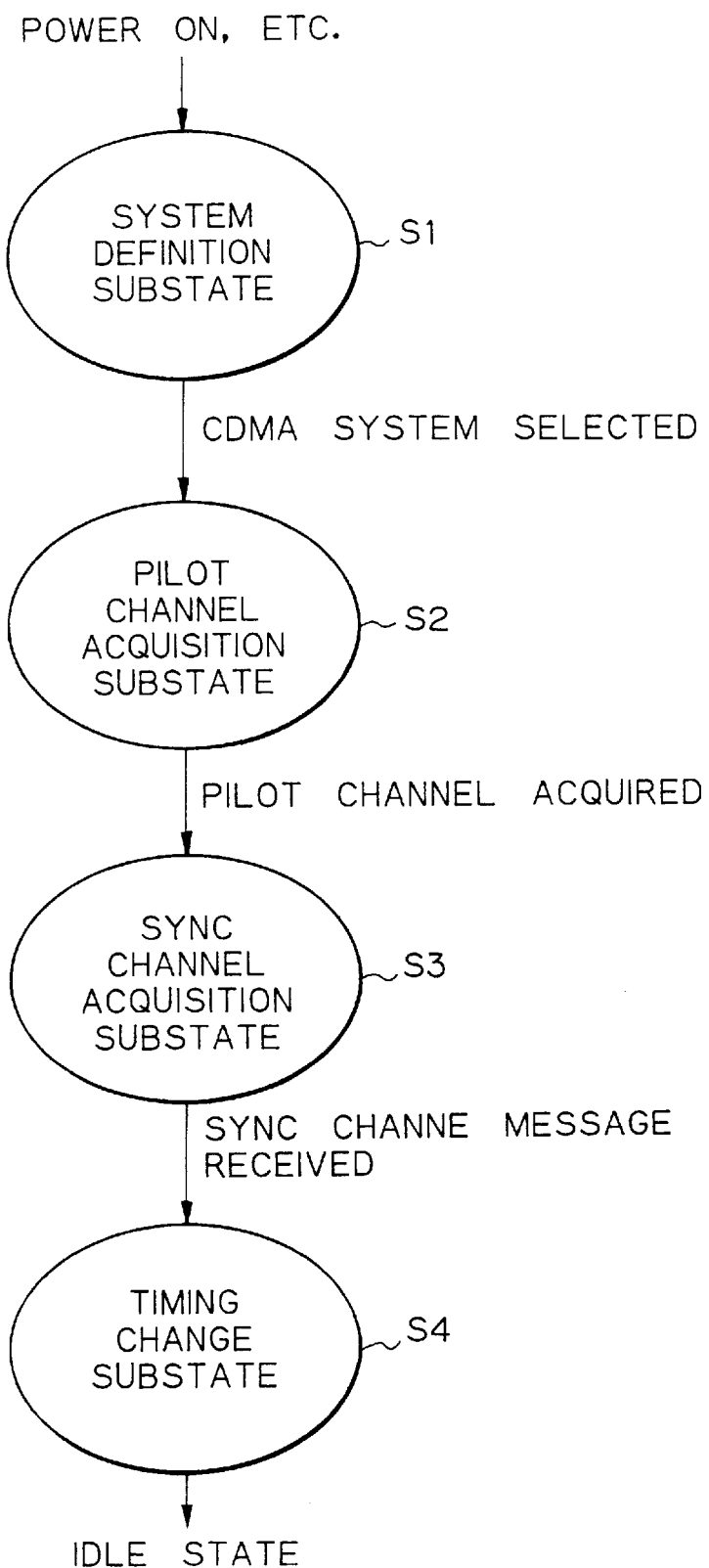
FIG. 4 is a chart demonstrating a routine to be executed by the embodiment at the initial state of the mobile station.

When the mobile station 7 shown in FIG. 2 moves from the cell 1 to the cell 2 and communicates with the base station 4, it must be switched from the analog mode to the CDMA mode and synchronized with the CDMA system 6. Reference will be made to FIG. 4 for describing how the mobile station 7 is switched from the analog mode to the CDMA mode and then fully synchronized with the CDMA system 6, i.e., a routine to be executed in the initial state. The routine to be described is executed by the controller 77 shown in FIG. 3.

The controller 77 initializes the mobile station 7 when a power switch, not shown, provided on the station 7 is turned on or when communication in a certain mode ends. As shown in FIG. 4, the initial state consists of four consecutive substates, i.e., a system definition substate SI, a pilot channel acquisition substate S2, a synchronizing (sync) channel acquisition substate S3, and a timing change substate S4. First, in the system definition substate SI, the controller 77 waits for the input of an operation mode (analog mode or CDMA mode) by the user. When the user designates the CDMA mode, the controller advances to the pilot channel acquisition substate S2. In the substate S2, the controller 77 receives a signal spread by a preselected spread code from the base station 4 over a pilot channel. Then, the controller 77 executes serial search acquisition using the serial search acquisition scheme via a serial search acquisition circuit which will be described. As a result, the phase of the spread code to be output from the base station 7 is synchronized with the spread code on the pilot channel. The operation of the serial search acquisition circuit will be described in detail later.

On successfully setting up synchronization in the substate S2, the controller 77 executes the sync channel acquisition substate S3. In the substate S3, the controller 77 receives sync channel message information modulated by a preselected spread code from the base station 4 over a sync channel, and demodulates the received information. The controller 77 executes preselected processing with the demodulated data so as to obtain various kinds of system construction information including a pilot channel spread code offset and system timing.

The above substate S3 is followed by the timing change substate S4. In the substate S4, the controller 77 synchronizes the spread code phase and system timing of the mobile station 7 with those of the CDMA system 6 in accordance with the pilot channel spread code offset, system timing, and so forth received in the substate S3. On completing the substate S4, the controller 77 sets up an idle or stand-by state in the mobile station 7. As a result, the mobile station is ready to communicate with the base station 4, allowing the user to again originate a call and resume conversation.

The problem with the pilot channel acquisition substate S2 is that a substantial period of time is necessary for the spread code of the mobile station 7 to be synchronized with the pilot channel spread code due to the nature of the serial search acquisition circuit. The illustrative embodiment is capable of reducing the above period of time or synchronizing time by using the information for rapid synchronization received from the base system 3 of the analog system 5 previously. The serial search acquisition circuit will be described with reference to FIG. 1.

Figure 1:
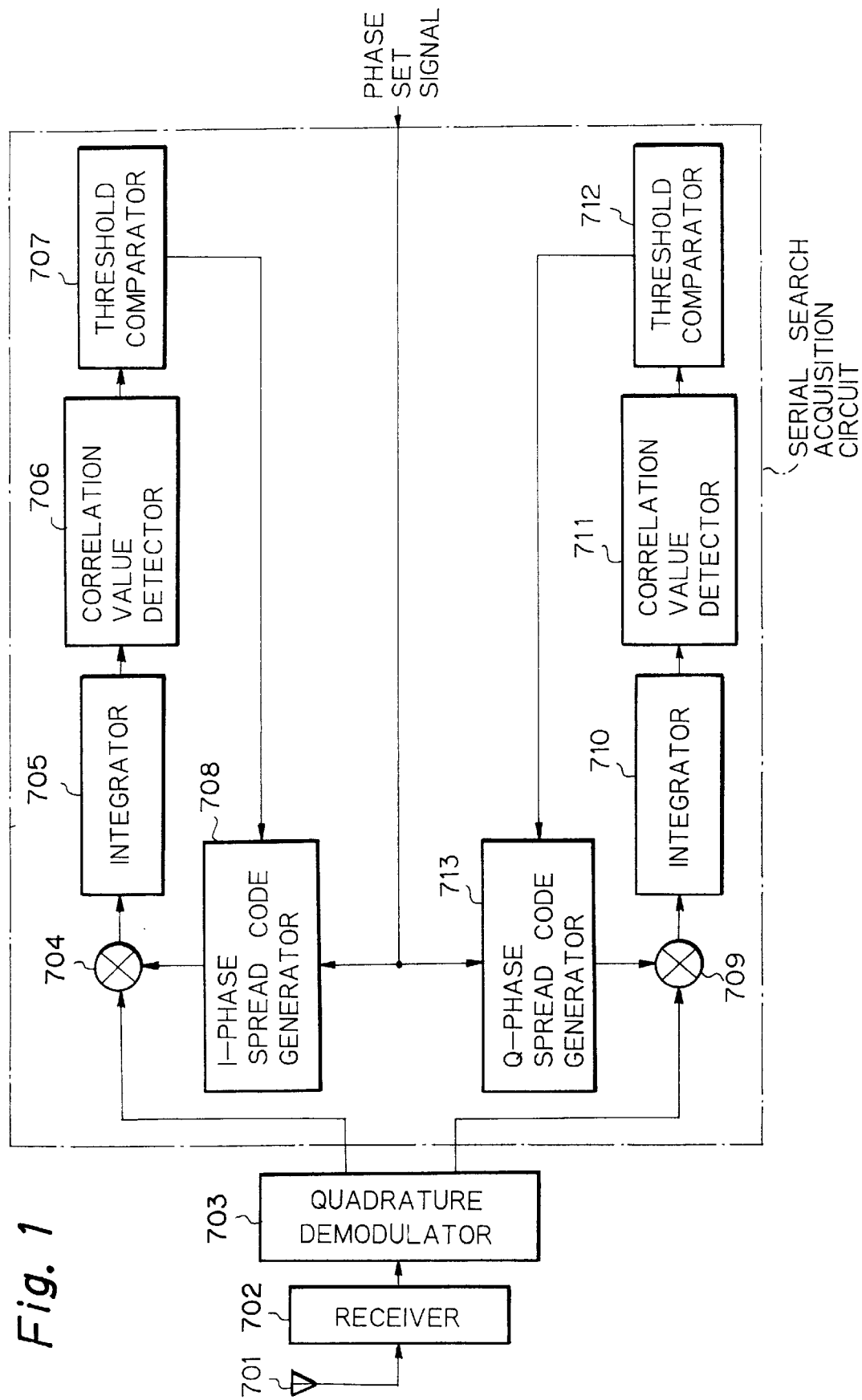
FIG. 1 is a block diagram schematically showing a serial search acquisition circuit included in an embodiment of the mobile communication system in accordance with the present invention.

As shown in FIG. 1, the serial search acquisition circuit has a multiplier 704, an integrator 705, a correlation value detector 706, a threshold comparator 707, an I-phase spread code generator 708, a multiplier 709, an integrator 710, a correlation value detector 711, a threshold comparator 712, and a Q-phase spread code generator 713 connected together, as illustrated. An antenna 701 is connected to the acquisition circuit via a receiver 702 and a quadrature demodulator 703.

The acquisition circuit is included in the digital mode transmitter/receiver 75, FIG. 3. Briefly, the acquisition circuit generates a spread code identical with the spread code of the base station 4, FIG. 2, at a suitable timing, and sequentially shifts the timing until the timing of the spread code coincides with the timing of the spread code being received from the base station 4.

First, assume that the user of the mobile station 7 has turned on the power switch of the station 7 in the cell 2 operable with the CDMA system 6, as shown in FIG. 2. Then, the acquisition circuit of FIG. 1 sets up synchronization using a signal being received from the base station 4. Although such a procedure is conventional, it will be described in order to better understand synchronization to be set up when the mobile station 7 is handed over from the analog system cell 1 to the CDMA system cell 4.

The signal being sent from the base station 4 and spread by the preselected spread code (pilot channel spread code) is received by the antenna 701 and fed to the receiver 702. The receiver 702 amplifies the received signal, transforms the amplified signal to an IF (Intermediate Frequency) signal, filters the IF signal, and delivers the filtered IF signal to the quadrature demodulator 703. The demodulator 703 demodulates the input IF signal to produce I-phase data and Q-phase data. The I-phase data and Q-phase data are respectively applied to the multipliers 704 and 709 of the acquisition circuit.

The multiplier 704 computes a correlation between the I-phase data input from the demodulator 703 and a spread code input from the I-phase spread code generator 708. The computed correlation is applied to the integrator 705. The spread code output from the I-phase spread code generator 708 is identical with the pilot channel spread code output from the base station 4 and is constantly generated at a suitable timing. The integrator 705 integrates the correlation output of the multiplier 704 over one period of the spread code, and feeds the resulting integrated signal to the correlation value detector 706. In response, the detector 706 determines the size of the integrated signal and delivers the size or correlation value to the threshold comparator 707. The threshold comparator 707 compares the correlation value and a preselected threshold value.

Assume that the received signal is a signal spread by the desired pilot channel spread code, and that the current phase of the spread code output from the I-phase spread code generator 708 is coincident with the phase of the pilot channel spread code, i.e., the time lag is zero. Then, the multiplier 704 outputs a correlation signal having a relatively great amplitude with the result that the correlation value exceeds the threshold value, as determined by the comparator 707. This shows that the spread code output from the spread code generator 708 and the pilot channel spread code are coincident in phase. Therefore, the acquisition circuit ends the acquisition routine.

On the other hand, assume that the phase of the spread code output from the I-phase spread code generator 708 is not coincident with the phase of the pilot channel spread code. Then, the multiplier 708 simply outputs a noise signal of low level. In this case, the correlation value is smaller than the threshold value, as determined by the comparator 707. This shows that the spread code output from the spread code generator 708 is not coincident in phase with the pilot channel spread code. The comparator 707 delivers a phase shift command to the spread code generator 708.

In response to the phase shift command, the spread code generator 708 advances or retards the phase of the spread code by, e.g., half a chip. The acquisition circuit repeats the above procedure until the spread code output from the spread code generator 708 coincides in phase with the pilot channel spread code. So long as the pilot channel spread code is a desired spread code, the phase of the spread code output from the spread code generator 708 will successfully coincide with the phase of the pilot channel spread code within one period of the pilot channel spread code. The multiplier 709, integrator 710, correlation value detector 711, threshold comparator 712 and Q-phase spread code generator 713 operated in the same manner, but with the Q data.

Now, assume that the user of the mobile station 7 ends conversation in the analog system cell 1, and then resumes it after the handoff of the station 7 from the cell 1 to the CDMA system cell 2. In this case, the mobile station 7 has stored in its memory the information for rapid synchronization received from the base station 3 in the cell 1 over the control channel. On the entry of the mobile station 7 in the cell 2, the controller 77, FIG. 3, reads the above information out of the memory in the pilot channel acquisition substate S2, FIG. 4.

The information for rapid synchronization is useful to bring the phases of the spread codes output from the I-phase and Q-phase spread code generators 708 and 713 into coincidence with the phase of the pilot channel spread code. In the illustrative embodiment, the information is implemented by a pilot channel spread code offset and system timing included in the sync channel message as prescribed by the North American Standard IS-95. The system timing shows the controller 77 the absolute time which is the reference of the system timing in the CDMA system 6. Likewise, the pilot channel spread code offset shows the controller 77 the offset of the pilot channel spread code from the absolute time. Consequently, the controller 77 is allowed to see the generation timing of the desired pilot channel spread code.

The controller 77 generates, based on the pilot channel spread code offset and system timing read out of the memory, a phase set signal coincident in phase with the pilot channel spread code. If desired, the phase set signal may be implemented as a pulse signal coincident with the head of the pilot channel spread code. The phase set signal is fed from the controller 77 to the I-phase and Q-phase spread code generators 708 and 713, FIG. 1. In response, the spread code generators 708 and 713 each resets the phase of the respective spread code.

Figure 5:
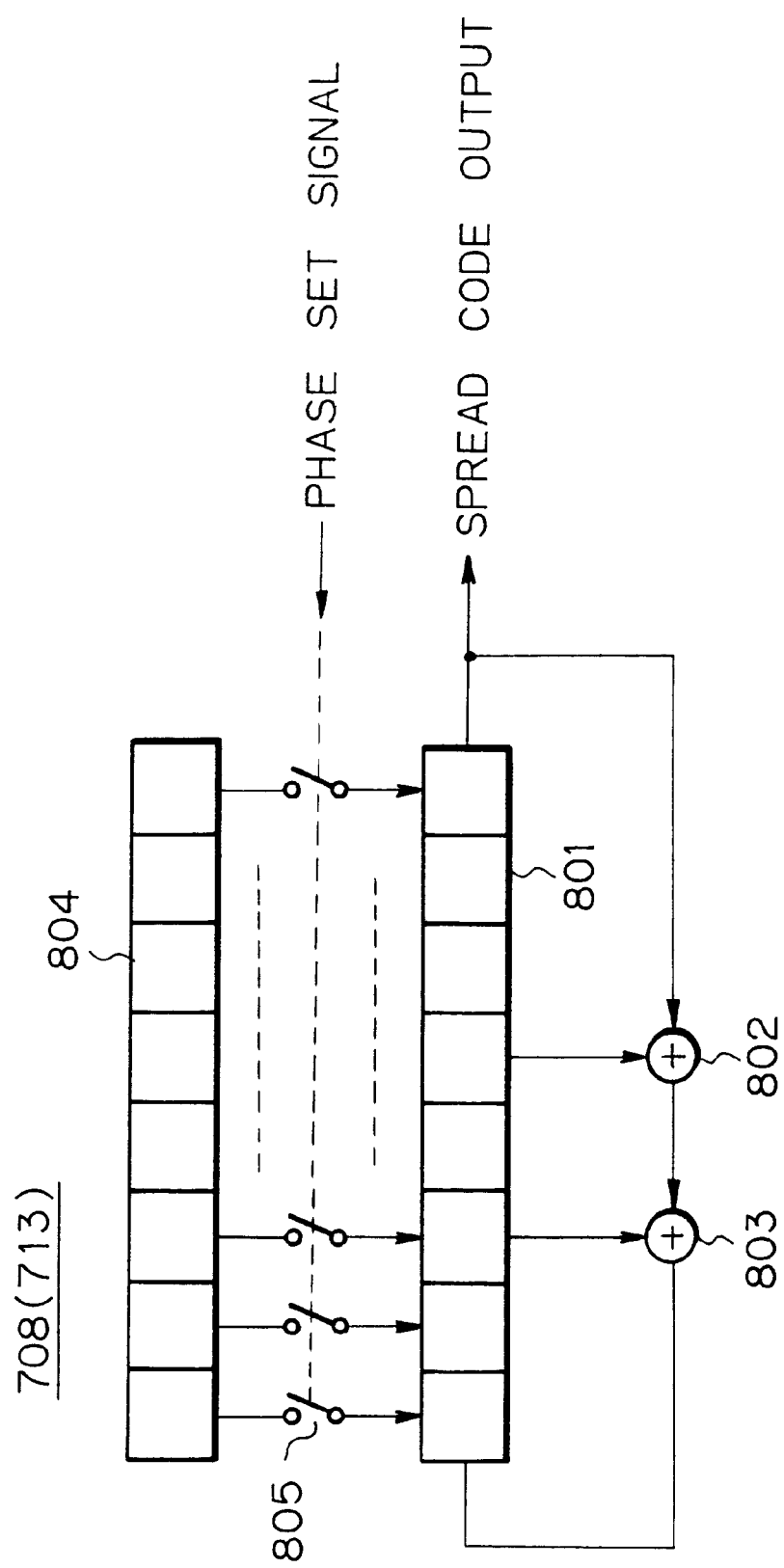
FIG. 5 shows how a spread code generator included in the embodiment matches the phase of a spread code.

How the I-phase and Q-phase spread code generators 708 and 713 set their phases will be described with reference to FIG. 5. As shown, the spread code generators 708 and 713 each has a shift register 801 and two adders 802 and 803. The shift register 801 is made up of n one-bit registers cascaded together. The adders 802 and 803 each produces an Exclusive OR of two signals input thereto. Data stored in the consecutive registers of the shift register 801 are sequentially shifted toward the output side. As a result, a spread code appears on the output of the shift register 801. The other shift 20 register 804 also has n one-bit registers cascaded together. The registers of the shift register 804 are respectively connected to the corresponding registers of the shift register 801 via switches 805. The switches 805 are driven by the phase set signal mentioned earlier.

A spread code coincident with the desired pilot channel spread code is stored in the shift register 804 beforehand under the control of the controller 77. The phase set signal fed from the controller 77 causes the shift register 801 to interrupt its operation, and drives the switches 805. As a result, the contents of the registers of the shift register 804 are transferred to the corresponding registers of the other shift register 801 via the switches 805. The contents of the shift register 804 are now coincident with the desired pilot channel spread code. Then, the spread code generator resumes its operation.

The phase or timing of the phase set signal is coincident with the phase of the desired pilot channel spread code received from the base station 4, as stated above. Therefore, the spread code output from the spread code generator is brought into coincident with the phase of the desired pilot channel spread code when reset by the phase set signal. In this manner, the phase set signal allows the phases of the spread codes output from the I-phase and Q-phase spread code generators 704 and 713 to coincide with the phase of the pilot channel spread code in an extremely short period of time.

In summary, it will be seen that the present invention provides a mobile communication system in which a mobile station located in, e.g., a small area or cell based on an analog system receives from a base station information for the rapid acquisition of a pilot channel in a CDMA area next to the above area. Therefore, on entering the CDMA system area, the mobile station can acquire a desired pilot channel rapidly by use of the above information.

While the present invention has been described with reference to the particular illustrative embodiment, it is not to be restricted by the embodiment. It is to be appreciated that those skilled in the art can change or modify the embodiment without departing from the scope and spirit of the present invention. For example, while the analog system 5 shown in FIG. 2 is an analog FDMA (Frequency Division Multiple Access) system assigning a particular frequency to each mobile station, it may be implemented by a digital TDMA (Time Division Multiple Access) system in which mobile stations share a single frequency on a time division basis.

What is claimed is:

1. A mobile communication system comprising:

a first communication system including means for transmitting a signal spread by a preselected spread code over a pilot channel;

a second communication system including means for transmitting information for establishing synchronization with said spread code; and a mobile station;

said mobile station comprising:
   means for receiving said information transmitted from said second communication system;
   spread code generating means for generating a spread code identical with said preselected spread code of said first communication system; and
   means for adjusting, based on said information, a phase of said spread code output from said spread code generating means to coincide with a phase of said preselected code of said first communication system.

2. A system in accordance with claim 1, wherein said second communication system communicates with said mobile station by one of an analog system and a digital system.

3. A system in accordance with claim 1, wherein said first communication system communicates with said mobile station by a CDMA system.

4. A system in accordance with claim 1, wherein said second communication system transmits said information to said mobile station over a control channel.

5. A system in accordance with claim 1, wherein said second communication system transmits said information to said mobile station by using an idle field of a communication channel used to transmit speech information.

6. A system in accordance with claim 1, wherein said information is representative of system timing defining an absolute time for a reference of said system and a pilot channel spread code offset indicating an offset of the pilot channel spread code from the absolute time.

7. A method of setting up synchronization for a mobile communication system, comprising the steps of:

transmitting from a first communication system a signal spread by a preselected spread code over a pilot channel;

transmitting from a second communication system information for establishing synchronization with said preselected spread code;

receiving by a mobile station said information from said second communication system generating a spread code identical with the preselected spread code in the mobile station; and bringing in the mobile station, when receiving said signal from said first communication system, a phase of the generated spread code identical with said preselected spread code into coincidence with a phase of said preselected spread code on the basis of said information received.

* * * * *